US012674052B2

(12) United States Patent
Klimke et al.

(10) Patent No.: US 12,674,052 B2
(45) Date of Patent: Jul. 7, 2026

(54) POLYPROPYLENE COMPOSITION FOR CABLE INSULATION

(71) Applicant: BOREALIS AG, Vienna (AT)

(72) Inventors: Katja Klimke, Linz (AT); Per-Ola Hagstrand, Stenungsund (SE); Ulf Nilsson, Stenungsund (SE); Thomas Gkourmpis, Stenungsund (SE); Lars Efraimsson, Stenungsund (SE); Anette Johansson, Stenungsund (SE); Jingbo Wang, Linz (AT); Kristian Dahlén, Stenungsund (SE); Gerhard Hubner, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 19/113,979

(22) PCT Filed: Sep. 26, 2023

(86) PCT No.: PCT/EP2023/076455
§ 371 (c)(1),
(2) Date: Mar. 21, 2025

(87) PCT Pub. No.: WO2024/068579
PCT Pub. Date: Apr. 4, 2024

(65) Prior Publication Data
US 2025/0263545 A1    Aug. 21, 2025

(30) Foreign Application Priority Data

Sep. 28, 2022    (EP) ..................................... 22198327

(51) Int. Cl.
| | |
|---|---|
| *C08L 23/16* | (2006.01) |
| *C08K 3/22* | (2006.01) |
| *C08K 5/00* | (2006.01) |
| *C08K 5/098* | (2006.01) |
| *C08K 5/105* | (2006.01) |
| *C08K 5/524* | (2006.01) |

(52) U.S. Cl.
CPC ............... *C08L 23/16* (2013.01); *C08K 3/22* (2013.01); *C08K 5/0083* (2013.01); *C08K 5/098* (2013.01); *C08K 5/105* (2013.01); *C08K 5/524* (2013.01); *C08K 2003/222* (2013.01); *C08L 2203/202* (2013.01); *C08L 2205/03* (2013.01); *C08L 2207/02* (2013.01)

(58) Field of Classification Search
CPC ............... C08L 23/16; C08L 2203/202; C08L 2207/02; C08L 23/12; C08L 23/142
See application file for complete search history.

(56) References Cited

U.S. PATENT DOCUMENTS

| | | | |
|---|---|---|---|
| 5,234,879 A | 8/1993 | Garoff et al. |
| 8,680,207 B2 | 3/2014 | Klimke et al. |
| 8,901,249 B2 | 12/2014 | Shedenig et al. |
| 9,296,884 B2 | 3/2016 | Massari et al. |
| 9,890,274 B2 | 2/2018 | Wang et al. |
| 10,385,196 B2 | 8/2019 | Cronen et al. |
| 10,781,304 B2 | 9/2020 | Wang et al. |
| 10,800,910 B2 | 10/2020 | Galyajtner et al. |
| 11,292,858 B2 | 4/2022 | Boragno et al. |
| 11,384,232 B2 | 7/2022 | Onodera et al. |
| 11,578,198 B2 | 2/2023 | Gahleitner et al. |
| 2021/0363314 A1 | 11/2021 | Wang et al. |
| 2022/0135779 A1 | 5/2022 | Wang et al. |
| 2022/0251357 A1 | 8/2022 | Defoer et al. |

FOREIGN PATENT DOCUMENTS

| | | | | |
|---|---|---|---|---|
| CN | 111630077 A | * | 9/2020 | ............ C08F 210/06 |
| EA | 033422 B1 | | 10/2019 | |
| EA | 038637 B1 | | 9/2021 | |
| EP | 491566 A2 | | 6/1992 | |
| EP | 586390 A1 | | 3/1994 | |
| EP | 591224 A1 | | 4/1994 | |
| EP | 0887379 B1 | | 12/2004 | |
| EP | 1681315 A1 | | 7/2006 | |
| EP | 2739679 A1 | | 6/2014 | |
| EP | 3741806 A1 | | 11/2020 | |
| KR | 20120061980 A | | 6/2012 | |

(Continued)

OTHER PUBLICATIONS

Translation of CN111630077 obtained by the European Patent Office in November of 2025 (Year: 2020).*

(Continued)

*Primary Examiner* — Arrie L Reuther
*Assistant Examiner* — Devin Mitchell Darling
(74) *Attorney, Agent, or Firm* — Lowenstein Sandler LLP

(57)    ABSTRACT

The present invention relates to a cable comprising at least one layer comprising a polypropylene composition comprising (A) from 80.0 to 99.0 wt.-%, preferably from 82.5 to 97.2 wt. %, most preferably from 85.0 to 95.0 wt.-% of a copolymer of propylene and comonomer units selected from ethylene and alpha-olefins having from 4 to 12 carbon atoms having a total amount of comonomer units of from 10.0 to 16.0 wt %, preferably from 11.0 to 15.0 wt %, most preferably from 12.0 to 14.0 wt %, based on the total amount of monomer units of the copolymer of propylene (A); a melt flow rate MFR2 of from 0.5 to 2.5 g/10 min, preferably from 0.8 to 2.3 g/10 min, still more preferably from 1.0 to 2.0 g/10 min and most preferably from 1.2 to 1.7 g/10 min; a xylene cold soluble (XCS) fraction in a total amount of from 25.0 to 50.0 wt %, preferably from 27.5 to 45.0 wt %, more preferably from 30.0 to 42.5 wt % and most preferably from 32.5 to 40.0 wt %, based on the total weight amount of the copolymer of propylene (A); and (B) from 1.0 to 20.0 wt.-%, preferably from 2.5 to 17.5 wt %, most preferably from 5.0 to 15.0 wt.-% of a propylene polymer having a density of from 855 to 890 kg/m, preferably from 860 to 885 kg/m³, mot preferably from 865 to 880 kg/m³.

15 Claims, No Drawings

(56) References Cited

FOREIGN PATENT DOCUMENTS

| KR | 101985611 B1 | 6/2019 |
|----|----|----|
| RU | 2478668 C2 | 4/2013 |
| RU | 2528384 C2 | 9/2014 |
| RU | 2712913 C1 | 2/2020 |
| RU | 2724050 C1 | 6/2020 |
| RU | 2739399 C1 | 12/2020 |
| RU | 2765100 C1 | 1/2022 |
| RU | 2775266 C1 | 6/2022 |
| RU | 2782633 C1 | 10/2022 |
| WO | 9212182 A1 | 7/1992 |
| WO | 9219653 A1 | 11/1992 |
| WO | 9219658 A1 | 11/1992 |
| WO | 9924478 A1 | 5/1999 |
| WO | 9924479 A1 | 5/1999 |
| WO | 9933843 A1 | 7/1999 |
| WO | 0068315 A1 | 11/2000 |
| WO | 03000754 A1 | 1/2003 |
| WO | 03000757 A1 | 1/2003 |
| WO | 2004000899 A1 | 12/2003 |
| WO | 2004111095 A1 | 12/2004 |
| WO | 2006097497 A1 | 9/2006 |
| WO | 2011076780 A1 | 6/2011 |
| WO | 2013007650 A1 | 1/2013 |
| WO | 2013092620 A1 | 6/2013 |
| WO | 2015091839 A1 | 6/2015 |
| WO | 2017198633 A1 | 11/2017 |
| WO | 2019176913 A1 | 9/2019 |

OTHER PUBLICATIONS

International Search Report and Written Opinion for Patent Application No. PCT/EP2023/076455 mailed Dec. 20, 2023, 11 pages.
European Search Report for European Patent Application No. 22198327.3 dated Feb. 27, 2023, 6 pages.
Busico, et al., "Microstructure of polypropylene," Progress in Polymer Science, vol. 26, 2001, pp. 443-533.
Busico, et al., "Full Assignment of the 13C NMR Spectra of Regioregular Polypropylenes: Methyl and Methylene Region," Macromolecules, 1997, vol. 30, pp. 6251-6263, American Chemical Society.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Cheng, H.N., "C NMR Analysis of Ethylene-Propylene Rubbers," Macromolecules, 1984, vol. 17, 1984, pp. 1950-1955.
Definition of terms relating to the non-ultimate mechanical properties of polymers, Pure & Appl. Chem. vol. 70, No. 3, pp. 701-754, 1998.
Zweifel, et al., "Plastic Additives Handbook", 6th edition, Hanser Publications, 2009 pp. 1141 to 1190.
Heino, et al., "The Influence of Molecular Structure on Some Rheological Properties of Polyethylene", Annual Transactions of the Nordic Rheology Society, 1995, pp. 71-73.
Heino et al., "Rheological Characterization of Polyethylene Fractions", Theoretical and Applied Rheology, Proc. Xlth Int. Congr. on Rheology, Brussels, Belgium, Aug. 17-21, 1992, pp. 360-362.
Kakugo, et al., "C NMR Determination of Monomer Sequence Distribution in Ethylene-Propylene Copolymers Prepared with s-TiCL13-AL (C2H5)2C1," Macromolecules, 1982, vol. 15, pp. 1150-1152.
Randall, et al., "A Review of High Resolution Liquid 13Carbon Nuclear Magnet Resonance Characterizations of Ethylene-Based Polymers", Rev. Macromol. Chem. Phys. 1989, C29, 201-317.
Resconi, et al., "Selectivity in Propene Polymerization with Metallocene Catalysts," Chem. Rev., 2000, vol. 100, pp. 1253-1345.
Singh, et al., "Triad Sequence Determination of Ethylene-Propylene Copolymers—Application of Quantitative 13C NMR," Polymer Testing, 2009, vol. 29, pp. 475-479.
Wang, et al., "Structural Analysis of Ethylene/Propylene Copolymers Synthesized with a Constrained Geometry Catalyst," Macromolecules, 2000, vol. 33, pp. 1157-1162.
Zhou, et al., "A new decoupling method for accurate quantification of polyethylene copolymer composition and triad sequence distribution with 13C NMR," Journal of Magnetic Resonance, vol. 187, 2007, pp. 225-233.
Decision to Grant with English translation for Korean Patent Application No. 10-2025-7013059, dated Jul. 2, 2025, 5 pages.
Office Action with English translation for Russian Patent Application No. 2025110307 dated Nov. 19, 2025, 13 pages.

* cited by examiner

POLYPROPYLENE COMPOSITION FOR CABLE INSULATION

CROSS-REFERENCE TO RELATED APPLICATION(S)

The present application is a national stage entry under 35 U.S.C. § 371 of International Application No. PCT/EP2023/076455, filed on Sep. 26, 2023, which claims priority to European (EP) patent application Ser. No. 22/198,327.3, filed on Sep. 28, 2022. The contents of these applications are hereby incorporated by reference in their entirety.

FIELD OF THE INVENTION

The present invention relates to a cable comprising an insulation layer comprising a flexible polypropylene composition.

TECHNICAL BACKGROUND

Nowadays, ethylene polymer products are used as insulation and semiconducting shields for low, medium and high voltage cables, due to easy processability and their beneficial electrical properties. In addition, in low voltage applications polyvinyl chloride (PVC) is also commonly used as insulation material, usually in combination with softeners to reach desirable softness of cables. PVC is a thermoplastic which by incorporation of various plasticizers can be used in a wide temperature range. For standard PVC a continuous conductor temperature of max. 70° C. is normal. At low temperatures PVC becomes rigid and usage temperatures below –10° C. should be avoided. At conductor temperatures over 100° C. the plasticizers migrate out and the materials lose their flexibility. However, with the addition of special plasticizers and stabilizers, PVC materials can be produced for conductor temperatures of 90-105° C. But in essence, PVC is mainly used for the 1 kV area, as the higher permittivity and dissipation factor of the material means that the losses increase too much at higher voltages and therefore PVC cables are not normally not used over 1 kV. In addition, softeners have to be added to PVC in order to maintain a high level of flexibility. Insufficient amounts of softeners reduce low temperature properties of PVC significantly. From an environmental point of view, these softeners are not always regarded as problem-free, making them desirable to eliminate.

Especially for medium, high and extra high voltage (MV, HV and EHV) cables, as well as high-voltage direct current (HVDC) cables, insulation material presently is dominated by crosslinked ethylene polymer (XLPE) products. These products have a high operation temperature, a high electric breakdown strength and good mechanical properties. However, due to its crosslinking the XLPE is not recyclable by remelting. Therefore, attempts were made to use thermoplastic material and especially thermoplastic propylene polymers as insulation material for medium, high and extra high voltage (MV, HV and EHV) cables as well as high-voltage direct current (HVDC) cables. Further, power network owners are developing an increasing interest for cables that can be recycled by remelting.

Thus, there is an increasing interest in polymer compositions based on thermoplastic propylene polymers for insulation layers of medium voltage (MV), high voltage (HV), extra high voltage (EHV) and high-voltage direct current (HVDC) cables. Thereby, the propylene polymers need to show a good balance of properties as regards e.g. flexibility, mechanical properties, impact properties and electrical breakdown strength.

Thus, there is a need in the art for polypropylene compositions suitable for cable insulation and shows a good balance of properties as regards flexibility, mechanical properties, impact properties and electric breakdown strength, when used as cable insulation for MV or HV cables.

SUMMARY OF THE INVENTION

The present invention relates to a cable comprising at least one layer comprising a polypropylene composition comprising (A) from 80.0 to 99.0 wt.-%, preferably from 82.5 to 97.2 wt. %, most preferably from 85.0 to 95.0 wt.-%, based on the total weight of the polypropylene composition, of a copolymer of propylene and comonomer units selected from ethylene and alpha-olefins having from 4 to 12 carbon atoms having a total amount of comonomer units of from 10.0 to 16.0 wt % preferably from 11.0 to 15.0 wt %, most preferably from 12.0 to 14.0 wt %, based on the total amount of monomer units of the copolymer of propylene (A);

a melt flow rate $MFR_2$ of from 0.5 to 2.5 g/10 min, preferably from 0.8 to 2.3 g/10 min, still more preferably from 1.0 to 2.0 g/10 min and most preferably from 1.2 to 1.7 g/10 min;

a xylene cold soluble (XCS) fraction in a total amount of from 25.0 to 50.0 wt %, preferably from 27.5 to 45.0 wt %, more preferably from 30.0 to 42.5 wt % and most preferably from 32.5 to 40.0 wt %, based on the total weight amount of the copolymer of propylene (A); and (B) from 1.0 to 20.0 wt.-%, preferably from 2.5 to 17.5 wt %, most preferably from 5.0 to 15.0 wt.-%, based on the total weight of the polypropylene composition, of a propylene polymer having a density of from 855 to 890 $kg/m^3$, preferably from 860 to 885 $kg/m^3$, mot preferably from 865 to 880 $kg/m^3$.

Definitions

A heterophasic polypropylene is a propylene-based copolymer with a semi-crystalline matrix phase, which can be a propylene homopolymer or a random copolymer of propylene and at least one alpha-olefin comonomer, and an elastomeric phase dispersed therein. The elastomeric phase can be a propylene copolymer with a high amount of comonomer, which is not randomly distributed in the polymer chain but are distributed in a comonomer-rich block structure and a propylene-rich block structure.

A heterophasic polypropylene usually differentiates from a one-phasic propylene copolymer in that it shows two distinct glass transition temperatures Tg which are attributed to the matrix phase and the elastomeric phase.

A propylene homopolymer is a polymer, which essentially consists of propylene monomer units. Due to impurities especially during commercial polymerization processes a propylene homopolymer can comprise up to 0.1 mol % comonomer units, preferably up to 0.05 mol % comonomer units and most preferably up to 0.01 mol % comonomer units.

A propylene random copolymer is a copolymer of propylene monomer units and comonomer units in which the comonomer units are distributed randomly over the polypropylene chain. Thereby, a propylene random copolymer includes a fraction, which is insoluble in xylene—xylene cold insoluble (XCI) fraction—in an amount of at least 85 wt %, most preferably of at least 88 wt %, based on the total amount of propylene random copolymer. Accordingly, the propylene random copolymer does not contain an elastomeric polymer phase dispersed therein.

Usually, a propylene polymer comprising at least two propylene polymer fractions (components), which have been produced under different polymerization conditions resulting in different (weight average) molecular weights and/or different comonomer contents for the fractions, preferably produced by polymerizing in multiple polymerization stages with different polymerization conditions, is referred to as "multimodal". The prefix "multi" relates to the number of different polymer fractions the propylene polymer is consisting of. As an example of multimodal propylene polymer, a propylene polymer consisting of two fractions only is called "bimodal", whereas a propylene polymer consisting of three fractions only is called "trimodal".

A unimodal propylene polymer only consists of one fraction.

Thereby, the term "different" means that the propylene polymer fractions differ from each other in at least one property, preferably in the weight average molecular weight—which can also be measured in different melt flow rates of the fractions—or comonomer content or both.

An elastomer is a polymer with viscoelasticity and weak intermolecular forces. The term "elastomer" can be used interchangeably with "rubber".

Polyolefin based elastomers, such as polypropylene based elastomers, i.e. an elastomer with a molar majority of olefin monomer units, such as propylene monomer units, are usually thermoplastic elastomers.

Thermoplastic elastomers have both thermoplastic and elastomeric properties. Polyolefin based elastomers, such as polypropylene based elastomers, usually show a low density and low viscosity. They can be propylene homopolymers or propylene-alpha olefin copolymers, such as propylene-ethylene copolymers. A specific class of polypropylene based elastomers are propylene homopolymers or propylene-alpha olefin copolymers, such as propylene-ethylene copolymers, which have been polymerized in the presence of a single site catalyst, usually in a solution polymerization process.

Vis-breaking is a post reactor chemical process for modifying semi-crystalline polymers such as propylene polymers. During the vis-breaking process, the propylene polymer backbone is degraded, for example by means of peroxides, such as organic peroxides, via beta scission. The degradation is generally used for increasing the melt flow rate and narrowing the molecular weight distribution.

In the following amounts are given in % by weight (wt %) unless it is stated otherwise.

DETAILED DESCRIPTION OF THE INVENTION

Polypropylene Composition

The polypropylene composition in the at least one layer of the inventive cable comprises (A) from 80.0 to 99.0 wt.-%, preferably from 82.5 to 97.2 wt. %, most preferably from 85.0 to 95.0 wt.-%, based on the total weight of the polypropylene composition, of a copolymer of propylene and comonomer units selected from ethylene and alpha-olefins having from 4 to 12 carbon atoms having a total amount of comonomer units of from 10.0 to 16.0 wt %, preferably from 11.0 to 15.0 wt %, most preferably from 12.0 to 14.0 wt %, based on the total amount of monomer units of the copolymer of propylene (A);

a melt flow rate $MFR_2$ of from 0.5 to 2.5 g/10 min, preferably from 0.8 to 2.3 g/10 min, still more preferably from 1.0 to 2.0 g/10 min and most preferably from 1.2 to 1.7 g/10 min;

a xylene cold soluble (XCS) fraction in a total amount of from 25.0 to 50.0 wt %, preferably from 27.5 to 45.0 wt %, more preferably from 30.0 to 42.5 wt % and most preferably from 32.5 to 40.0 wt %, based on the total weight amount of the copolymer of propylene (A); and (B) from 1.0 to 20.0 wt.-%, preferably from 2.5 to 17.5 wt %, most preferably from 5.0 to 15.0 wt.-%, based on the total weight of the polypropylene composition, of a propylene polymer having a density of from 855 to 890 $kg/m^3$, preferably from 860 to 885 $kg/m^3$, mot preferably from 865 to 880 $kg/m^3$.

The polypropylene composition preferably comprises the copolymer of propylene and comonomer units selected from ethylene and alpha-olefins having from 4 to 12 carbon atoms (A) in an amount of from 80.0 to 99.0 wt.-%, preferably from 82.5 to 97.2 wt. %, most preferably from 85.0 to 95.0 wt.-% and the propylene polymer (B) in an amount of from 1.0 to 20.0 wt.-%, preferably from 2.5 to 17.5 wt %, most preferably from 5.0 to 15.0 wt.-%, all based on the total weight of the polypropylene composition.

In the following the copolymer of propylene and comonomer units selected from ethylene and alpha-olefins having from 4 to 12 carbon atoms (A) is also denoted component (A) and the propylene polymer (B) is also denoted component (B).

The polypropylene composition can further comprise polymeric components, which are different from the components (A) and (B), in an amount of preferably 0.0 to 10.0 wt % based on the total weight of the polypropylene composition.

In a preferred embodiment the polymeric components of the polypropylene composition consist of components (A) and (B).

Besides these polymeric components the polypropylene composition can comprise one or more additives in an amount of from 0.0 up to 5.0 wt %, based on the total weight of the polypropylene composition. The one or more additives are preferably selected from acid scavengers, antioxidants, alpha nucleating agents, beta nucleating agents, etc. Such additives are commercially available and for example described in "Plastic Additives Handbook", 6th edition 2009 of Hans Zweifel (pages 1141 to 1190).

Usually, these additives are added in quantities of 1 to 50000 ppm for each single component.

The one or more additives can be added to the polymeric components in a blending step.

Thereby, the one or more additives can be added to the polymeric components in form of master batches in which one or more additives are blended with a carrier polymer in concentrated amounts. Any optional carrier polymer is calculated to the amount of additives, based on the total weight of the propylene copolymer composition.

The polypropylene composition preferably has a total amount of units derived from ethylene of from 5.0 to 20.0 wt %, more preferably from 7.5 to 17.5 wt % and most preferably from 10.0 to 15.0 wt %, based on the total amount of monomer units in the polypropylene composition.

Further, the polypropylene composition preferably has a total amount of units derived from propylene of from 80.0 to 95.0 wt %, more preferably from 82.5 to 92.5 wt % and most preferably from 85.0 to 90.0 wt %, based on the total amount of monomer units in the polypropylene composition.

It is preferred that the polymeric compounds of the polypropylene composition consist of units derived from propylene and ethylene. Thus, the weight amounts of units derived from propylene and ethylene add up to 100 wt % of the total amount of monomer units in the polypropylene composition.

The polypropylene composition preferably has a xylene cold soluble (XCS) fraction in a total amount of from 25.0 to 55.0 wt %, more preferably from 27.5 to 52.5 wt %, still more preferably from 30.0 to 50.0 wt % and most preferably from 32.5 to 47.5 wt %, based on the total weight amount of the polypropylene composition.

The xylene cold soluble (XCS) fraction preferably has a total amount of units derived from ethylene of from 15.0 to 35.0 wt %, more preferably from 17.5 to 32.5 wt % and most preferably from 20.0 to 30.0 wt %, based on the total amount of monomer units in the xylene cold soluble (XCS) fraction.

Further, the xylene cold soluble (XCS) fraction preferably has a total amount of units derived from propylene of from 65.0 to 85.0 wt %, more preferably from 67.5 to 82.5 wt % and most preferably from 70.0 to 80.0 wt %, based on the total amount of monomer units in the xylene cold soluble (XCS) fraction.

It is preferred that the polymeric compounds of the xylene cold soluble (XCS) fraction consist of units derived from propylene and ethylene. Thus, the weight amounts of units derived from propylene and ethylene add up to 100 wt % of the total amount of monomer units in the xylene cold soluble (XCS) fraction.

Further, the xylene cold soluble (XCS) fraction preferably has an intrinsic viscosity of from 150 to 300 $cm^3$/g, preferably from 175 to 275 $cm^3$/g and most preferably from 190 to 240 $cm^3$/g, measured in decalin.

Additionally, the xylene cold soluble (XCS) fraction preferably has a weight average molecular weight Mw of from 150000 to 300000 g/mol, more preferably from 175000 to 325000 g/mol and most preferably from 200000 to 275000 g/mol.

Furthermore, the xylene cold soluble (XCS) fraction preferably has a polydispersity index, being the ratio of the weight average molecular weight and the number average molecular weight Mw/Mn, of from 3.5 to 8.5, preferably from 3.7 to 8.0 and most preferably from 4.0 to 7.5.

Further, the polypropylene composition has a fraction insoluble in cold xylene (XCI) preferably in a total amount of from 45.0 to 75.0 wt %, more preferably from 47.5 to 72.5 wt % still more preferably from 50.0 to 70.0 wt % and most preferably from 52.5 to 67.5 wt %, based on the total weight amount of the polypropylene composition.

In the polypropylene composition the xylene cold soluble (XCS) fraction and the fraction insoluble in cold xylene (XCI) add to 100 wt % of the polypropylene composition.

The fraction insoluble in cold xylene (XCI) preferably has a total amount of units derived from ethylene of from 0.7 to 10.0 wt %, more preferably from 1.0 to 8.5 wt % and most preferably from 2.5 to 7.5 wt %, based on the total amount of monomer units in the fraction insoluble in cold xylene (XCI).

Further, the fraction insoluble in cold xylene (XCI) preferably has a total amount of units derived from propylene of from 85.0 to 99.0 wt %, more preferably from 87.5 to 97.5 wt % and most preferably from 90.0 to 96.0 wt %, based on the total amount of monomer units in the fraction insoluble in cold xylene (XCI).

Further, the fraction insoluble in cold xylene (XCI) preferably has an intrinsic viscosity of from 200 to 375 $cm^3$/g, preferably from 222 to 350 $cm^3$/g and most preferably from 250 to 325 $cm^3$/g, measured in decalin.

Additionally, the fraction insoluble in cold xylene (XCI) preferably has a weight average molecular weight Mw of from 250000 to 450000 g/mol, more preferably from 275000 to 425000 g/mol and most preferably from 300000 to 400000 g/mol. Furthermore, the fraction insoluble in cold xylene (XCI) preferably has a polydispersity index, being the ratio of the weight average molecular weight and the number average molecular weight Mw/Mn, of from 4.0 to 7.5, preferably from 4.2 to 7.0 and most preferably from 4.5 to 6.5.

The ratio of the intrinsic viscosities of the XCI fraction to the XCS fraction of the polypropylene composition (IV (XCI)/IV(XCS)) is preferably in the range of from 1.0 to 1.7, more preferably from 1.0 to 1.5 and most preferably from 1.1 to 1.4.

Further, the ratio of the weight average molecular weights of the XCI fraction to the XCS fraction of the polypropylene composition (Mw(XCI)/Mw(XCS)) is preferably in the range of from 1.00 to 1.75, more preferably from 1.10 to 1.65 and most preferably from 1.15 to 1.60.

The polypropylene composition preferably has a melt flow rate $MFR_2$ of 0.5 to 3.5 g/10 min, preferably from 0.8 to 3.2 g/10 min, still more preferably from 1.0 to 3.0 g/10 min and most preferably from 1.2 to 2.7 g/10 min.

The polypropylene composition preferably has a flexural modulus of from 150 MPa to 450 MPa, more preferably of from 175 MPa to 440 MPa and most preferably of from 200 MPa to 425 MPa.

Preferably, the polypropylene composition has a Charpy notched impact strength at 23° C. of from 50 to 110 $kJ/m^2$, more preferably from 65 to 100 $kJ/m^2$ and most preferably from 70 to 95 $kJ/m^2$.

Further, the polypropylene composition preferably has a Charpy notched impact strength at −20° C. of from 1.5 to 25.0 $kJ/m^2$, more preferably from 1.7 to 20.0 $kJ/m^2$ and most preferably from 2.0 to 15.0 $kJ/m^2$.

Further, the polypropylene composition has a melting temperature Tm of from 140 to 159° C., preferably from 143 to 157° C. and most preferably from 145 to 153° C.

Additionally, the polypropylene composition preferably has a crystallization temperature Tc of from 85 to 130° C., more preferably from 87 to 128° C. and most preferably from 90 to 125° C.

The difference of the melting temperature to the crystallization temperature Tm-Tc is preferably in the range of from 20 to 65° C., preferably 25 to 60° C. and most preferably from 27 to 55° C.

The polypropylene composition preferably has at least two glass transition temperatures. Said two glass transition temperatures can be attributed to the matrix phase (Tg (matrix)) and the elastomeric phase (Tg (EP)).

Further. the polypropylene composition preferably has a glass temperature attributed to the matrix phase Tg (matrix) in the range of from −1.0 to −17.5° C., preferably from −2.5 to −15.0° C. and most preferably from −5.0 to −12.5° C.

Still further, the polypropylene composition preferably has a glass temperature attributed to the elastomeric phase Tg (EP) of from −40.0 to −55.0° C., preferably from −42.5 to −52.5° C. and most preferably from −45.0 to −50.0° C.

Preferably, the polypropylene composition has a shear thinning index $SHI_{1/00}$ of from 2.5 to 22.5, more preferably from 5.0 to 20.0 and most preferably from 7.5 to 17.5.

Further, the polypropylene composition preferably has a polydispersity index PI of from 1.0 to 4.5 $s^{-1}$, more preferably from 1.5 to 4.0 $s^{-1}$ and most preferably from 2.0 to 3.7 $s^{-1}$.

Preferably, the polypropylene composition is prepared by melt blending the components (A) and (B), the optional additional polymeric components and the optional further additives, all as described above or below.

The polypropylene composition is preferably not subjected to vis-breaking.

It is preferred that the polypropylene composition does not comprise, i.e. is free of a dielectric fluid, such as e.g. described in EP 2 739 679.

In the following, the copolymer of propylene and comonomer units selected from ethylene and alpha-olefins having from 4 to 12 carbon atoms (A) (abbreviated "copolymer of propylene (A)" or component (A)) and the propylene polymer (B) (abbreviated component (B)) described in more detail.

Copolymer of Propylene (A)

The polypropylene composition comprises a copolymer of propylene and comonomer units selected from ethylene and alpha-olefins having from 4 to 12 carbon atoms (A) (in the following "copolymer of propylene (A)").

The comonomer units are selected from ethylene and alpha-olefins having from 4 to 12 carbon atoms, such as ethylene, 1-butene, 1-hexene or 1-octene. The copolymer of propylene (A) can comprise one type of comonomer units or two or more types such as two types of comonomer units. It is preferred that the copolymer of propylene (A) comprises one type of comonomer units. Especially preferred is ethylene.

The copolymer of propylene (A) preferably has a total amount of comonomer units, preferably of ethylene, of from 10.0 to 16.0 wt %, preferably from 11.0 to 15.0 wt %, most preferably from 12.0 to 14.0 wt %, based on the total amount of monomer units in the copolymer of propylene (A).

It is preferred that the copolymer of propylene (A) is a heterophasic copolymer of propylene.

The heterophasic propylene copolymer has a matrix phase and an elastomeric phase dispersed in said matrix phase.

The matrix phase is preferably a propylene random copolymer.

The comonomer units of said propylene random copolymer of the matrix phase usually are the same as for the copolymer of propylene as described above. Said comonomer units preferably are selected from ethylene and alpha-olefins having from 4 to 12 carbon atoms, such as ethylene, 1-butene, 1-hexene or 1-octene. The propylene random copolymer of the matrix phase can comprise one type of comonomer units or two or more types such as two types of comonomer units. It is preferred that the propylene random copolymer of the matrix phase comprises one type of comonomer units. Especially preferred is ethylene.

Heterophasic propylene copolymers are typically characterized by comprising at least two glass transition temperatures. Said two glass transition temperatures can be attributed to the matrix phase (Tg (matrix)) and the elastomeric phase (Tg (EP)).

The heterophasic propylene copolymer preferably has a glass transition temperature attributed to the matrix phase Tg (matrix) in the range of from −1.0 to −15.0° C., preferably from −2.5 to −12.5° C. and most preferably from −5.0 to −10.0° C.

Further, the heterophasic propylene copolymer preferably has a glass transition temperature attributed to the elastomeric phase Tg (EP) in the range of from −40.0 to −55.0° C., preferably from −42.5 to −52.5° C. and most preferably from −45.0 to −50.0° C.

In a copolymer of propylene (A), such as a heterophasic propylene copolymer, the matrix phase and the elastomeric phase usually cannot exactly be divided from each other. In order to characterize the matrix phase and the elastomeric phase of a heterophasic polypropylene copolymer several methods are known. One method is the extraction of a fraction, which contains to the most part the elastomeric phase with xylene, thus separating a xylene cold solubles (XCS) fraction from a xylene cold insoluble (XCI) fraction. The XCS fraction contains for the most part the elastomeric phase and only a small part of the matrix phase whereas the XCI fraction contains for the most part the matrix phase and only a small part of the elastomeric phase.

The copolymer of propylene (A) preferably has a xylene cold soluble (XCS) fraction in a total amount of from 25.0 to 50.0 wt %, more preferably from 27.5 to 45.0 wt %, still more preferably from 30.0 to 42.5 wt % and most preferably from 32.5 to 40.0 wt %, based on the total weight amount of the copolymer of propylene (A).

The xylene cold soluble (XCS) fraction preferably has an amount of comonomer units, preferably of ethylene, of from 23.0 to 35.0 wt %, more preferably from 23.5 to 32.5 wt % and most preferably from 24.0 wt % to 30.0 wt %, based on the total amount of monomer units in the xylene cold soluble (XCS) fraction.

Further, the xylene cold soluble (XCS) fraction preferably has an intrinsic viscosity of from 150 to 350 $cm^3$/g, preferably from 200 to 325 $cm^3$/g and most preferably from 225 to 300 $cm^3$/g, measured in decalin.

Additionally, the xylene cold soluble (XCS) fraction preferably has a weight average molecular weight Mw of from 185000 to 350000 g/mol, more preferably from 200000 to 325000 g/mol and most preferably from 210000 to 315000 g/mol.

Furthermore, the xylene cold soluble (XCS) fraction preferably has a polydispersity index, being the ratio of the weight average molecular weight and the number average molecular weight Mw/Mn, of from 3.5 to 8.5, preferably from 3.7 to 8.0 and most preferably from 4.0 to 7.5.

Further, the copolymer of propylene (A) has a fraction insoluble in cold xylene (XCI) preferably in a total amount of from 50.0 to 75.0 wt %, more preferably from 55.0 to 72.5 wt %, still more preferably from 57.5 to 70.0 wt % and most preferably from 60.0 to 67.5 wt %, based on the total weight amount of the copolymer of propylene (A).

The fraction insoluble in cold xylene (XCI) preferably has an amount of comonomer units, preferably of ethylene, of from 3.0 to 9.0 wt %, preferably from 4.0 to 8.5 wt % and most preferably from 4.5 to 7.5 wt %, based on the total amount of monomer units in the fraction insoluble in cold xylene (XCI).

Further, the fraction insoluble in cold xylene (XCI) preferably has an intrinsic viscosity of from 185 to 350 $cm^3$/g, preferably from 220 to 325 $cm^3$/g and most preferably from 210 to 300 $cm^3$/g, measured in decalin.

Additionally, the fraction insoluble in cold xylene (XCI) preferably has a weight average molecular weight Mw of from 225000 to 450000 g/mol, more preferably from 240000 to 425000 g/mol and most preferably from 260000 to 400000 g/mol.

Furthermore, the fraction insoluble in cold xylene (XCI) preferably has a polydispersity index, being the ratio of the weight average molecular weight and the number average molecular weight Mw/Mn, of from 3.5 to 7.5, preferably from 3.7 to 7.0 and most preferably from 4.0 to 6.5.

The ratio of the intrinsic viscosities of the XCI fraction to the XCS fraction of the copolymer of propylene is preferably in the range of from 0.9 to 1.5, more preferably from 1.0 to 1.4 and most preferably from 1.0 to 1.3.

The copolymer of propylene (A) preferably has a melt flow rate $MFR_2$ of 0.5 to 2.5 g/10 min, preferably from 0.8 to 2.3 g/10 min, still more preferably from 1.0 to 2.0 g/10 min and most preferably from 1.2 to 1.7 g/10 min.

The copolymer of propylene (A) preferably has a flexural modulus of from 130 MPa to 400 MPa, more preferably of from 150 MPa to 390 MPa and most preferably of from 175 MPa to 380 MPa.

Preferably, the copolymer of propylene (A) has a Charpy notched impact strength at 23° C. of from 50 to 110 kJ/m$^2$, more preferably from 65 to 100 kJ/m$^2$ and most preferably from 75 to 95 kJ/m$^2$.

Further, the copolymer of propylene (A) preferably has a Charpy notched impact strength at −20° C. of from 5.0 to 10.0 kJ/m$^2$, more preferably from 5.5 to 9.0 kJ/m$^2$ and most preferably from 6.0 to 8.0 kJ/m$^2$.

Further, the copolymer of propylene (A) has a melting temperature Tm of from 140 to 159° C., preferably from 143 to 157° C. and most preferably from 145 to 153° C.

Additionally, the copolymer of propylene (A) has a crystallization temperature Tc of from 85 to 130° C., preferably from 87 to 128° C. and most preferably from 90 to 125° C.

The difference of the melting temperature to the crystallization temperature Tm-Tc is preferably in the range of from 20 to 65° C., preferably 25 to 60° C. and most preferably from 27 to 55° C.

It is preferred that the copolymer of propylene (A) has an intrinsic viscosity of from 185 to 350 cm$^3$/g, preferably from 200 to 325 cm$^3$/g and most preferably from 210 to 300 cm$^3$/g, measured in decalin.

The copolymer of propylene (A) can be polymerized in a sequential multistage polymerization process, i.e. in a polymerization process in which two or more polymerization reactors are connected in series. Preferably, in the sequential multistage polymerization process, two or more, more preferably three or more, such as three or four, polymerization reactors are connected in series. The term "polymerization reactor" shall indicate that the main polymerization takes place. Thus in case the process consists of four polymerization reactors, this definition does not exclude the option that the overall process comprises for instance a pre-polymerization step in a pre-polymerization reactor.

When the copolymer of propylene (A) is a heterophasic propylene copolymer, the matrix phase of the heterophasic propylene copolymer is polymerized in first polymerization reactor for producing a unimodal matrix phase or in the first and second polymerization reactor for producing a multimodal matrix phase.

The elastomeric phase of the heterophasic propylene copolymer is preferably polymerized in the subsequent one or two polymerization reactor(s) in the presence of the matrix phase for producing a unimodal elastomeric phase or a multimodal elastomeric phase.

Preferably, the polymerization reactors are selected from slurry phase reactors, such as loop reactors and/or gas phase reactors such as fluidized bed reactors, more preferably from loop reactors and fluidized bed reactors.

A preferred sequential multistage polymerization process is a "loop-gas phase"-process, such as developed by Borealis A/S, Denmark (known as BORSTAR® technology)

described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of LyondellBasell.

Suitable sequential polymerization processes for polymerizing the copolymer of propylene (A), preferably the heterophasic propylene copolymer, are e.g. disclosed in EP 1681 315 A1 or WO 2013/092620 A1.

The copolymer of propylene (A), preferably the heterophasic propylene copolymer can be polymerized in the presence of a Ziegler-Natta catalyst or a single site catalyst.

Suitable Ziegler-Natta catalysts are e.g. disclosed in U.S. Pat. No. 5,234,879, WO 92/19653, WO 92/19658, WO 99/33843, WO 03/000754, WO 03/000757, WO 2013/092620 A1 or WO 2015/091839.

Suitable single site catalysts are e.g. disclosed in WO 2006/097497, WO 2011/076780 or WO 2013/007650.

The copolymer of propylene (A) can be nucleated in the presence of an alpha-nucleating agent. The alpha-nucleating agent is preferably added to the copolymer of propylene (A) by melt-blending.

Preferably, the alpha-nucleating agent is added to the copolymer of propylene (A) in an amount of from 0.000001 to 5.00 wt %, more preferably from 0.00001 to 2.50 wt % of the (B), based on the total amount of the combined alpha-nucleating agent and copolymer of propylene (A).

The amount of pure alpha-nucleating agent (without optional carrier polymer of a master batch) is preferably in the range of from 0.01 to 6000 ppm, more preferably from 0.1 to 5000 ppm, based on the total amount of the combined alpha-nucleating agent and copolymer of propylene (A).

The alpha-nucleating agent (B) is preferably selected from soluble alpha-nucleating agents and particulate alpha-nucleating agents.

The alpha-nucleating agent (B) is preferably selected from the group consisting of
- (i) salts of monocarboxylic acids and polycarboxylic acids, e.g. sodium benzoate or aluminum tert-butylbenzoate, and
- (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, and
- (iii) salts of diesters of phosphoric acid, e.g. sodium 2,2'-methylenebis(4,6-di-tertbutylphenyl) phosphate or aluminium-hydroxy-bis[2,2'-methylene-bis(4,6-ditbutylphenyl)phosphate], and
- (iv) vinylcycloalkane polymer and vinylalkane polymer (as discussed in more detail below), and
- (v) mixtures thereof.

The alpha-nucleating agent is preferably selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, vinylcycloalkane polymer, vinylalkane polymer, and mixtures thereof.

Especially preferred are vinylcycloalkane polymers such as e.g. vinylcyclohexane (VCH) polymers. Such polymers can be added e.g. using Borealis Nucleation Technology (BNT).

The alpha-nucleating agent (B) can be added to the polypropylene composition as an isolated raw material or in a mixture with a carrier polymer, i.e. in a so-called master batch. The amount of the carrier polymer of the master batch thereby is calculated to the amount of the alpha-nucleating agent.

In one embodiment the copolymer of propylene (A) is alpha-nucleated.

In another embodiment the copolymer of propylene (A) is not alpha-nucleated.

The copolymer of propylene (A) is preferably not subjected to a visbreaking step as e.g. described in WO 2013/092620 A1.

Heterophasic propylene copolymer resins suitable as copolymer of propylene (A) are also commercially available. These resins are usually already additivated with stabilizer packages. Thus, when using commercially available resins as copolymer of propylene the addition of additives as described above might have to be adjusted to the already present additives.

Propylene Polymer (B)

The polypropylene composition comprises a propylene polymer (B).

The propylene polymer (B) can be propylene homopolymer or a copolymer of propylene with comonomer units selected from ethylene and alpha-olefins having from having from 4 to 12 carbon atoms.

The comonomer units are selected from ethylene and alpha-olefins having from 4 to 12 carbon atoms, such as ethylene, 1-butene, 1-hexene or 1-octene. The copolymer of propylene (A) can comprise one type of comonomer units or two or more types such as two types of comonomer units. It is preferred that the copolymer of propylene (A) comprises one type of comonomer units. Especially preferred is ethylene.

Further, the propylene polymer (B) has a density of from 855 to 890 kg/m$^3$, preferably from 860 to 885 kg/m$^3$, mot preferably from 865 to 880 kg/m$^3$.

Still further, the propylene polymer (B) preferably has a melting temperature Tm of from 50 to 110° C., more preferably from 55 to 105° C., most preferably from 60 to 100° C.

The propylene polymer (B) preferably has a melt flow rate MFR$_2$ of from 5.0 to 50000 g/10 min, more preferably from 6.0 to 40000 g/10 min, still more preferably from 7.0 to 35000 g/10 min and most preferably from 7.5 to 25000 g/10 min.

The propylene polymer (B) is preferably polymerized in the presence of a single site catalyst.

Suitable polymerization processes are solution polymerization processes.

Propylene polymer resins suitable as propylene polymer (B) are also commercially available. These resins are usually already additivated with stabilizer packages. Thus, when using commercially available resins as propylene polymer (B) the addition of additives as described above might have to be adjusted to the already present additives.

In one embodiment the propylene polymer (B) is a propylene homopolymer (first embodiment).

The propylene homopolymer has a density of from 855 to 890 kg/m$^3$, more preferably from 860 to 885 kg/m$^3$, mot preferably from 865 to 880 kg/m$^3$, determined according to ISO 1183.

Further, the propylene homopolymer preferably has a melt flow rate MFR$_2$ of from 500 to 5000 g/10 min, more preferably from 1000 to 4000 g/10 min, still more preferably from 1500 to 3500 g/10 min and most preferably from 2000 to 3000 g/10 min, determined according to ASTM D 1238 at 230° C. and 2.16 kg.

Still further, the propylene homopolymer preferably has a melting temperature Tm of from 65 to 95° C., preferably from 70 to 90° C., most preferably from 75 to 85° C., determined by DSC measurement.

Additionally, the propylene homopolymer preferably has a weight average molecular weight Mw of from 20 to 100 kg/mol, more preferably from 25 to 75 kg/mol, most preferably from 35 to 55 kg/mol, determined by GPC measurement.

Furthermore, the propylene homopolymer preferably has a viscosity at 190° C. of from 1000 to 50000 mPas, preferably from 2500 to 30000 mPas, most preferably from 5000 to 20000 mPas, determined according to ASTM D 3236.

Further, the propylene homopolymer preferably has a tensile modulus of from 25 to 150 MPa, preferably from 50 to 125 MPa, most preferably from 75 to 100 MPa, determined according to ISO 527.

Propylene homopolymers suitable as propylene polymer (B) are usually polymerized in the presence of a single site catalyst.

Such propylene homopolymer can be commercially available. One suitable example is L-Modu™ S400 from Idemitsu Kosan Co., Ltd.

In case of a commercially available propylene homopolymer the above stated properties can be measured using a common measurement method or verified by the technical documentation provided by the supplier.

In another embodiment the propylene polymer (B) is an elastomeric copolymer of propylene and ethylene (second embodiment).

In said embodiment the elastomeric copolymer of propylene and ethylene preferably has the following properties:

The elastomeric copolymer of propylene and ethylene has a density of from 855 to 890 kg/m$^3$, preferably from 860 to 885 kg/m$^3$, mot preferably from 865 to 880 kg/m$^3$.

Further, the elastomeric copolymer of propylene and ethylene preferably has a melt flow rate MFR$_2$ (230° C., 2.16 kg) of from 5000 to 50000 g/10 min, more preferably from 10000 to 40000 g/10 min, still more preferably from 12500 to 35000 g/10 min and most preferably from 15000 to 25000 g/10 min.

Such high melt flow rates are usually not measurable using the usual standard measurements such as ISO 1133 or ASTM D 1238, but are estimated from the viscosity curves and extrapolated to MFR$_2$ at 230° C., 2.16 kg for comparison to other polypropylene resins.

Still further, the elastomeric copolymer of propylene and ethylene preferably has a viscosity at 190° C. of from 500 to 10000 mPas, more preferably from 750 to 7500 mPas, most preferably from 1000 to 5000 mPas.

Additionally, the elastomeric copolymer of propylene and ethylene preferably has a melting temperature Tm of from 80 to 110° C., preferably from 85 to 105° C., most preferably from 90 to 100° C.

Furthermore, the elastomeric copolymer of propylene and ethylene preferably has a glass transition temperature Tg of from −40 to −10° C., preferably from −35 to −15° C., most preferably from −30 to −20° C.

Further, the elastomeric copolymer of propylene and ethylene preferably has an ethylene content of from 2.5 to 10.0 wt.-%, preferably from 3.5 to 8.5 wt.-%, mot preferably from 5.0 to 7.5 wt.-%.

Elastomeric copolymers of propylene and ethylene suitable as propylene polymer (B) are usually polymerized in the presence of a single site catalyst.

Such elastomeric copolymer of propylene and ethylene can be commercially available. One suitable example is Vistamaxx 8800 from ExxonMobil.

In case of a commercially available elastomeric copolymer of propylene and ethylene the above stated properties can be measured using a common measurement method or verified by the technical documentation provided by the supplier.

In yet another embodiment the propylene polymer (B) is an elastomeric copolymer of propylene and ethylene (third embodiment).

Said elastomeric copolymer of propylene and ethylene usually differs from the elastomeric copolymer of propylene and ethylene of the second embodiment in a lower melt flow rate $MFR_2$ (230° C., 2.16 kg), which indicates a higher viscosity.

In said embodiment the elastomeric copolymer of propylene and ethylene preferably has the following properties:

The elastomeric copolymer of propylene and ethylene has a density of from 855 to 890 kg/m³, preferably from 860 to 885 kg/m³, mot preferably from 865 to 880 kg/m³.

Further, the elastomeric copolymer of propylene and ethylene preferably has a melt flow rate $MFR_2$ of from a melt flow rate $MFR_2$ of from 5.0 to 100 g/10 min, preferably from 6.0 to 75 g/10 min, still more preferably from 7.0 to 60 g/10 min and most preferably from 7.5 to 50 g/10 min, determined according to ASTM D 1238 at 230° C. and 2.16 kg.

Additionally, the elastomeric copolymer of propylene and ethylene preferably has a melting temperature Tm of from 50 to 95° C., preferably from 55 to 90° C., most preferably from 60 to 85° C.

Furthermore, the elastomeric copolymer of propylene and ethylene preferably has a glass transition temperature Tg of from −40 to −10° C., preferably from −35 to −15° C., most preferably from −30 to −20° C.

Further, the elastomeric copolymer of propylene and ethylene preferably has crystallinity of from 5 to 50%, more preferably from 7 to 40%, most preferably from 9 to35%.

Still further, the elastomeric copolymer of propylene and ethylene preferably has a flexural modulus of from 15 to 200 MPa, preferably from 20 to 175 MPa, most preferably from 25 to 150 MPa, determined according to ASTM D 790.

Elastomeric copolymers of propylene and ethylene suitable as propylene polymer (B) are usually polymerized in the presence of a single site catalyst.

Such elastomeric copolymer of propylene and ethylene can be commercially available. Suitable examples are Versify 3300 and Versify 4200 from The Dow Chemical Company.

In case of a commercially available elastomeric copolymer of propylene and ethylene the above stated properties can be measured using a common measurement method or verified by the technical documentation provided by the supplier.

In still another embodiment the propylene polymer (B) is a wax of a copolymer of propylene and ethylene (fourth embodiment).

Said wax usually differs from the elastomeric copolymer of propylene and ethylene of the second embodiment in lower melt viscosity.

In said embodiment the wax preferably has the following properties:

The wax has a density of from 855 to 890 kg/m³, preferably from 860 to 885 kg/m³, mot preferably from 865 to 880 kg/m³.

Further, the wax preferably has a melt viscosity at 170° C. of from 50 to 500 mPas, more preferably from 100 to 400 mPas, most preferably from 125 to 300 mPas.

Still further, the wax preferably has a melting temperature Tm of from 65 to 95° C., more preferably from 70 to 90° C., most preferably from 75 to 85° C.

Additionally, the wax preferably has a crystallization temperature Tc of from 25 to 55° C., more preferably from 30 to 50° C., most preferably from 35 to 45° C.

Furthermore, the wax preferably has a drop point of from 75 to 105° C., more preferably from 80 to 100° C., most preferably from 85 to 95° C.

Waxes of copolymers of propylene and ethylene suitable as propylene polymer (B) are usually polymerized in the presence of a single site catalyst.

Such waxes can be commercially available. A suitable example is Licocene PP 1302 from Clariant.

In case of a commercially available wax the above stated properties can be measured using a common measurement method or verified by the technical documentation provided by the supplier.

Cable

The present invention relates to a cable comprising at least one layer comprising the polypropylene composition as defined above or below.

The cable preferably comprises an insulation layer comprising the polypropylene composition as described above or below.

The cable usually comprises of at least one conductor and at least one insulation layer comprising the polypropylene composition as described above or below.

The term "conductor" means herein above and below that the conductor comprises one or more wires. The wire can be for any use and be e.g. optical, telecommunication or electrical wire. Moreover, the cable may comprise one or more such conductors. Preferably the conductor is an electrical conductor and comprises one or more metal wires. The cable is preferably a power cable. A power cable is defined to be a cable transferring energy operating at any voltage, typically operating at voltages higher than 1 kV. The voltage applied to the power cable can be alternating (AC), direct (DC), or transient (impulse). The polypropylene composition of the invention is very suitable for power cables, especially for power cables operating at voltages 6 kV to 36 kV (medium voltage (MV) cables) and at voltages higher than 36 kV, known as high voltage (HV) cables and extra high voltage (EHV) cables, which EHV cables operate, as well known, at very high voltages. The terms have well known meanings and indicate the operating level of such cables.

For low voltage applications the cable system typically either consists of one conductor and one insulation layer comprising the polypropylene composition as described above or below, or of one conductor, one insulation layer comprising the polypropylene composition as described above or below and an additional jacketing layer, or of one conductor, one semiconductive layer and one insulation layer comprising the polypropylene composition as described above or below.

For medium and high voltage applications the cable system typically consists of one conductor, one inner semiconductive layer, one insulation layer comprising the polypropylene composition as described above or below and one outer semiconductive layer, optionally covered by an additionally jacketing layer.

The semiconductive layers mentioned preferably comprise, more preferably consist of a thermoplastic polyolefin composition, preferably a polyethylene composition or a polypropylene composition, containing a sufficient amount of electrically conducting solid fillers preferably carbon black. It is preferred that the thermoplastic polyolefin composition of the semiconductive layer(s) is a polypropylene composition, more preferably a polypropylene composition comprising a heterophasic propylene copolymer as polymeric component. It is especially preferred that the thermoplastic polyolefin composition of the at least one semiconductive layer, preferably both semiconductive layers of the cable, comprise the same copolymer of propylene as the insulation layer, i.e. the copolymer of propylene as described above or below.

The cable comprising an insulation layer comprising the polypropylene composition as described above shows good AC electrical breakdown strength in form of Weibull alpha-value and Weibull beta-value.

The cable preferably has a Weibull alpha-value of from 35.0 to 65.0 kV/mm, preferably from 37.5 to 65.0 kV/mm and most preferably from 40.0 to 65.0 kV/mm, when measured on a 10 kV cable.

Still further, the cable preferably has a Weibull beta-value of from 5.0 to 250.0, preferably from 5.5 to 250.0, most preferably from 6.0 to 250.0, when measured on a 10 kV cable.

Thus, the insulation layer comprising the polypropylene composition as described above or below can be used for medium and high voltage cables.

In yet another aspect the present invention relates to the use of the polypropylene composition as described above or below as cable insulation for medium and high voltage cables.

Said medium and high voltage cables preferably meet all properties requirements as described for the cables above and below.

Benefits of the Invention

The polypropylene composition shows a good balance of properties regarding high flexibility, a good mechanical strength, good impact properties and high crystallization and melting temperature which allow the use as cable insulation e.g. for medium and high voltage cables at high operation temperatures. By adding the propylene polymer (B) to the polypropylene composition the flexibility can be further improved, whereby the high crystallization and melting temperature and good impact properties are maintained.

It has been found that even with melt flow rates as low as 0.5 to 3.5 g/10 min the polypropylene composition can be easily compounded to prepare the insulation layer without need of increasing the melt flow rate via visbreaking the copolymer of propylene (A).

Cables comprising an insulation layer comprising the polypropylene composition surprisingly show good AC breakdown strength in form of Weibull alpha-value and Weibull beta-value. Thereby, the addition of the propylene polymer (B) to the polypropylene composition further improves the AC breakdown strength compared to polypropylene compositions which only include the copolymer of propylene (A) as polymeric compound.

The good AC breakdown strength in form of Weibull alpha-value and Weibull beta-value can be obtained without addition of a dielectric fluid such as e.g. described in EP 2 739 679.

EXAMPLES

The following definitions of terms and determination methods apply for the above general description of the invention as well as to the below examples unless otherwise defined.

1. Measurement Methods a) Melt Flow Rate ($MFR_2$)

The melt flow rate is the quantity of polymer in grams which the test apparatus standardized to ISO 1133 or ASTM D1238 extrudes within 10 minutes at a certain temperature under a certain load.

The melt flow rate $MFR_2$ of propylene based polymers and the polypropylene composition is measured at 230° C. with a load of 2.16 kg according to ISO 1133.

The melt flow rate can also be measured according to ASTM D 1238.

b) Density

The density is measured according to ISO 1183. Sample preparation is done by compression moulding in accordance with ISO 17855-2.

The density can also be measured according to ASTM D 792.

c) Comonomer Content

Quantitative nuclear-magnetic resonance (NMR) spectroscopy was used to quantify the comonomer content of the polymers.

Comonomer Content Quantification of Poly(Propylene-Co-Ethylene) Copolymers

Quantitative $^{13}C\{^1H\}$ NMR spectra were recorded in the solution-state using a Bruker Avance NEO 400 NMR spectrometer operating at 400.15 and 100.62 MHz for $^1H$ and $^{13}C$ respectively. All spectra were recorded using a $^{13}C$ optimised 10 mm extended temperature probe head at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 60 mM solution of relaxation agent in solvent {8} and with approximately 3 mg BHT (2,6-di-tert-butyl-4-methylphenol CAS 128-37-0). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {3, 4}. A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}C\{^1H\}$ spectra. This method was chosen for its robust nature and ability to account for the presence of regiodefects when needed. Integral regions were slightly adjusted to increase applicability across the whole range of encountered comonomer contents. For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E[mol \%]=100*fE$$

The weight percent comonomer incorporation was calculated from the mole fraction:

$$E[wt \%]=100*(fE*28.06)((fE*28.06)+((1-fE)*42.08))$$

Bibliographic References:

1) Busico, V., Cipullo, R., Prog. Polym. Sci. 26 (2001) 443.
2) Busico, V., Cipullo, R., Monaco, G., Vacatello, M., Segre, A. L., Macromolecules 30 (1997) 6251.
3) Zhou, Z., Kuemmerle, R., Qiu, X., Redwine, D., Cong, R., Taha, A., Baugh, D. Winniford, B., J. Mag. Reson. 187 (2007) 225.
4) Busico, V., Carbonniere, P., Cipullo, R., Pellecchia, R., Severn, J., Talarico, G., Macromol. Rapid Commun. 2007, 28, 1128.
5) Resconi, L., Cavallo, L., Fait, A., Piemontesi, F., Chem. Rev. 2000, 100, 1253.
6) Wang, W-J., Zhu, S., Macromolecules 33 (2000), 1157.
7) Cheng, H. N., Macromolecules 17 (1984), 1950.
8) Singh, G., Kothari, A., Gupta, V., Polymer Testing 28 5 (2009), 475.
9) Kakugo, M., Naito, Y., Mizunuma, K., Miyatake, T. Macromolecules 15 (1982) 1150.
10) Randall, J. Macromol. Sci., Rev. Macromol. Chem. Phys. 1989, C29, 201.
11) Resconi, L., Cavallo, L., Fait, A., Piemontesi, F., Chem. Rev. 2000, 100, 1253.

d) Differential Scanning Calorimetry (DSC) Analysis, Melting Temperature (Tm) and Crystallization Temperature (Tc):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C.

Crystallization temperature and heat of crystallization (Hc) are determined from the cooling step, while melting temperature and heat of fusion (Hf) are determined from the second heating step.

When a sample shows two or more melting temperatures and/or crystallization temperatures only the main melting temperature (at the highest Hc) and main crystallization temperature (at the highest Hf) are displayed in the accordant table. The difference of melting temperature and crystallization temperature (Tm-Tc) is given for the main melting temperature and the main crystallization temperature.

e) Xylene Cold Solubles (XCS) Content

The quantity of xylene soluble matter in polypropylene is determined according to the ISO16152 (first edition; 2005-07-01).

A weighed amount of a sample is dissolved in hot xylene under reflux conditions at 135° C. The solution is then cooled down under controlled conditions and maintained at 25° C. for 30 minutes to ensure controlled crystallization of the insoluble fraction. This insoluble fraction is then separated by filtration. Xylene is evaporated from the filtrate leaving the soluble fraction as a residue. The percentage of this fraction is determined gravimetrically.

$$\% \ XS = \frac{m_1 \times v_0}{m_0 \times v_1} \times 100$$

where m_0 is the mass of the sample test portion weighed, in grams m_1 is the mass of residue, in grams v_0 is the original volume of solvent taken v_1 is the volume of the aliquot taken for determination.

f) Glass Transition Temperature (Tg)

Glass transition temperature Tg was determined by dynamic mechanical analysis (DMTA) according to ISO 6721-7. The measurements were done in torsion mode on compression moulded samples (40×10×1 mm3) between −100° C. and +150° C. with a heating rate of 2° C./min and a frequency of 1 Hz. Tg was determined from the curve of the loss angle (tan($\delta$)).

g) Intrinsic Viscosity (IV)

The reduced viscosity (also known as viscosity number), $\eta_{red}$, and intrinsic viscosity, IV, are determined according to ISO 1628-3: "Determination of the viscosity of polymers in dilute solution using capillary viscometers".

Relative viscosities of a diluted polymer solution with concentration of 1 mg/ml and of the pure solvent (decahydronaphthalene stabilized with 200 ppm 2,6-bis(1,1-dimethylethyl)-4-methylphenol) are determined in an automated capillary viscometer (Lauda PVS1) equipped with 4 Ubbelohde capillaries placed in a thermostatic bath filled with silicone oil. The bath temperature is maintained at 135° C. The sample is dissolved with constant stirring until complete dissolution is achieved (typically within 90 min).

The efflux time of the polymer solution as well as of the pure solvent are measured several times until three consecutive readings do not differ for more than 0.2 s (standard deviation).

The relative viscosity of the polymer solution is determined as the ratio of averaged efflux times in seconds obtained for both, polymer solution and solvent:

$$\eta_{rel} = \frac{t_{solution} - t_{solvent}}{t_{solvent}} \quad [dimensionless]$$

Reduced viscosity ($\eta_{red}$) is calculated using the equation:

$$\eta_{red} = \frac{t_{solution} - t_{solvent}}{t_{solvent} * C} \quad [dl/g]$$

where C is the polymer solution concentration at 135° C.:

$$C = \frac{m}{V\gamma},$$

and m is the polymer mass, V is the solvent volume, and $\gamma$ is the ratio of solvent densities at 20° C. and 135° C. ($\gamma = \rho_{20}/\rho_{135} = 1.107$).

The calculation of intrinsic viscosity IV is performed by using the Schulz-Blaschke equation from the single concentration measurement:

$$IV = \frac{\eta_{red}}{1 + K + C + \eta_{red}}$$

where K is a coefficient depending on the polymer structure and concentration. For calculation of the approximate value for IV, K=0.27.

h) Molecular Weight Averages, Polydispersity (Mn, Mw, Mz, MWD) by GPC-Analysis (GPC)

For the GPC analysis the column set was calibrated using universal calibration (according to ISO 16014-2:2003) with 19 narrow MWD polystyrene (PS) standards in the range of 0.5 kg/mol to 11 500 kg/mol. The PS standards were dissolved at 160° C. for 15 min or alternatively at room temperatures at a concentration of 0.2 mg/ml for molecular weight higher and equal 899 kg/mol and at a concentration of 1 mg/ml for molecular weight below 899 kg/mol. The conversion of the polystyrene peak molecular weight to polyethylene molecular weights is accomplished by using the Mark Houwink equation and the following Mark Houwink constants:

$$K_{PS} = 19 \times 10^{-3} \text{ ml/g}, \alpha_{PS} = 0.655$$

$$K_{PE} = 39 \times 10^{-3} \text{ ml/g}, \alpha_{PE} = 0.725$$

A third order polynomial fit was used to fit the calibration data.

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined using the following formulas:

$$M_n = \frac{\sum_{i=1}^{N} A_i}{\sum (A_i/M_i)} \tag{1}$$

$$M_w = \frac{\sum_{i=1}^{N} (A_i \times M_i)}{\sum A_i} \tag{2}$$

$$M_z = \frac{\sum_{i=1}^{N} (A_i \times M_i^2)}{\sum (A_i/M_i)} \tag{3}$$

i) Flexural Modulus

The flexural modulus was determined acc. to ISO 178 method A (3-point bending test) on 80 mm×10 mm×4 mm specimens. Following the standard, a test speed of 2 mm/min and a span length of 16 times the thickness was used. The testing temperature was 23±2° C. Injection moulding was carried out according to ISO 19069-2 using a melt temperature of 230° C. for all materials irrespective of material melt flow rate.

j) Charpy Notched Impact Strength

The Charpy notched impact strength was determined acc. to ISO 179-1/1 eA on notched 80 mm×10 mm×4 mm specimens (specimens were prepared according to ISO 179-1/1 eA). Testing temperatures were 23±2° C. or −20±2° C. Injection moulding was carried out acc. to ISO 19069-2 using a melt temperature of 230° C. for all materials irrespective of material melt flow rate.

k) Rheological Measurements

Dynamic Shear Measurements (Frequency Sweep Measurements)

The characterisation of melt of polymer composition or polymer as given above or below in the context by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \tag{1}$$

If the applied strain is within the linear viscoelastic regime, the resulting sinusoidal stress response can be given by $$\sigma(t) = \sigma_0 \sin(\omega t + \delta) \tag{2}$$

where $\sigma_0$ and $\gamma_0$ are the stress and strain amplitudes, respectively $\omega$ is the angular frequency $\delta$ is the phase shift (loss angle between applied strain and stress response)

t is the time

Dynamic test results are typically expressed by means of several different rheological functions, namely the shear storage modulus G', the shear loss modulus, G", the complex shear modulus, G*, the complex shear viscosity, $\eta^*$, the dynamic shear viscosity, $\eta'$, the out-of-phase component of the complex shear viscosity $\eta''$ and the loss tangent, tan $\delta$ which can be expressed as follows:

$$G' = \frac{\sigma_0}{\gamma_0} \cos\delta \, [Pa] \tag{3}$$

$$G'' = \frac{\sigma_0}{\gamma_0} \sin\delta \, [Pa] \tag{4}$$

$$G^* = G' + iG'' \, [Pa] \tag{5}$$

$$\eta^* = \eta' - i\eta'' \, [Pa \cdot s] \tag{6}$$

$$\eta' = \frac{G''}{\omega} \, [Pa \cdot s] \tag{7}$$

$$\eta'' = \frac{G'}{\omega} \, [Pa \cdot s] \tag{8}$$

The determination of so-called Shear Thinning Index, which correlates with MWD and is independent of Mw, is done as described in equation 9.

$$SHI_{(x/y)} = \frac{Eta* \text{ for } (G*= x\ kPa)}{Eta* \text{ for } (G*= y\ kPa)} \quad (9)$$

For example, the $SHI_{(2/100)}$ is defined by the value of the complex viscosity, in Pa·s, determined for a value of $G*$ equal to 1 kPa, divided by the value of the complex viscosity, in Pa·s, determined for a value of $G*$ equal to 100 kPa.

The values of storage modulus (G'), loss modulus (G"), complex modulus (G*) and complex viscosity ($\eta*$) were obtained as a function of frequency ($\omega$).

Thereby, e.g. $\eta*_{300rad/s}$ (eta$*_{300rad/s}$ or eta$_{300}$) is used as abbreviation for the complex viscosity at the frequency of 300 rad/s and $\eta*_{0.005rad/s}$ (eta$*_{0.05rad/s}$ or eta$_{0.05}$) is used as abbreviation for the complex viscosity at the frequency of 0.05 rad/s.

The polydispersity index, PI, is defined by equation 10.

$$PI = \frac{10^5}{G'(\omega_{COP})}, \omega_{COP} = \omega \text{ for } (G' = G'') \quad (10)$$

where $\omega_{COP}$ is the cross-over angular frequency, determined as the angular frequency for which the storage modulus, G', equals the loss modulus, G".

The values are determined by means of a single point interpolation procedure, as defined by Rheoplus software. In situations for which a given $G*$ value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

References:

[1] Rheological characterization of polyethylene fractions" Heino, E. L., Lehtinen, A., Tanner J., Seppala, J., Neste Oy, Porvoo, Finland, Theor. Appl. Rheol., Proc. Int. Congr. Rheol, 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995.).

[3] Definition of terms relating to the non-ultimate mechanical properties of polymers, Pure & Appl. Chem., Vol. 70, No. 3, pp. 701-754, 1998.

1) AC Electric Breakdown Strength (ACBD)

The AC breakdown tests were performed in agreement with CENELEC HD 605 5.4.15.3.4 for 6/10 kV cables. The cable was thus cut into six test samples of 10 meter active length (terminations in addition). The samples were tested to breakdown with a 50 Hz AC step test at ambient temperature, according to the following procedure:

Start at 18 kV for 5 minutes

Voltage increasing in step of 6 kV every 5 minutes until breakdown occurs

The calculation of the Weibull parameters of the data set of six breakdown values (conductor stress, i.e. the electric field at the inner semiconductive layer) follows the least squares regression procedure as described in IEC 62539 (2007). The Weibull alpha parameter in this document refers to the scale parameter of the Weibull distribution, i.e. the voltage for which the failure probability is 0.632. The Weibull beta value refers to the shape parameter.

2. Propylene Copolymer Composition

The following resins were used for the preparation of the propylene copolymer compositions of the examples:

a) Polymerization of the Heterophasic Propylene Copolymer Powder A1

Catalyst

The catalyst used in the polymerization process for the heterophasic propylene copolymer powder A1 was a Ziegler-Natta catalyst, which is described in patent publications EP491566, EP591224 and EP586390. As co-catalyst tri-ethyl-aluminium (TEAL) and as donor dicyclo pentyl dimethoxy silane (D-donor) was used.

Polymerization of the heterophasic propylene copolymer powder

Heterophasic propylene copolymer powder A1 was produced in a Borstar™ plant in the presence of the above described polymerization catalyst using one liquid-phase loop reactor and two gas phase reactors connected in series under conditions as shown in Table 1. The first reaction zone was a loop reactor and the second and third reaction zones were gas phase reactors. The matrix phase was polymerized in the loop and first gas phase reactor and the elastomeric phase was polymerized in the second gas phase reactor. The catalyst as described above was fed into a prepolymerization reactor which precedes the first reaction zone.

TABLE 1

Polymerization conditions of the heterophasic propylene copolymer powder:

| | | A1-powder |
|---|---|---|
| Prepolymerization | | |
| TEAL/Ti ratio | [mol/mol] | 342 |
| Donor/Ti ratio | [mol/mol] | 26.9 |
| Temperature | [° C.] | 19.9 |
| Residence time | [h] | 0.16 |
| Loop | | |
| Temperature | [° C.] | 70.0 |
| Pressure | [barg] | 55 |
| Split (Loop + Prepol) | [%] | 33.7 |
| H2/C3 ratio | [mol/kmol] | 5.5 |
| C2/C3 ratio | [mol/kmol] | 16.7 |
| MFR (230° C./2.16 kg) | [g/10 min] | 6.5 |
| C2 content (calc.) | [wt %] | 2.0 |
| GPR 1 | | |
| Temperature | [° C.] | 74.9 |
| Pressure | [barg] | 21.0 |
| Split (GPR1) | [%] | 48.2 |
| H2/C3 ratio | [mol/kmol] | 21.3 |
| C2/C3 ratio | [mol/kmol] | 53.4 |
| MFR (230° C./2.16 kg) | [g/10 min] | 1.3 |
| C2 content (calc.) | [wt %] | 6.5 |
| GPR 2 | | |
| Temperature | [° C.] | 79.99 |
| Pressure | [barg] | 16.03 |
| Split (GPR2) | [%] | 18.2 |
| C2/C3 ratio | [mol/kmol] | 401 |
| H2/C3 ratio | [mol/kmol] | 69 |
| MFR (230° C./2.16 kg) | [g/10 min] | 1.2 |
| XCS | [wt %] | 35.3 |
| C2 (content calc.) | [wt %] | 10.5 | b) Preparation of the Polypropylene Compositions

The heterophasic propylene copolymer powder A1 from the polymerization reaction was compounded in a twin screw extruder together with different stabilizer packages to obtain the polypropylene compositions of reference examples RE1, RE2 and RE3. For reference example RE2 an alpha-nucleating agent was added to the powder.

For reference example RE3 an alpha-nucleating agent was added to the powder and the composition was visbroken to a melt flow rate MFR$_2$ (230° C., 2.16 kg) of 3.9 g/10 min as disclosed in the example section of WO 2017/198633.

An overview of the production of the polypropylene compositions of examples RE1, RE2 and RE3 is shown in Table 2.

TABLE 2

| Compounding of RE1 and RE2 in a twin screw extruder: | | | | |
|---|---|---|---|---|
| | | RE1 | RE2 | RE3 |
| HECO-powder | | A1-powder | A1-powder | A1-powder |
| Visbreaking | | No | No | yes |
| Stabiliser onepack 1 | [wt %] | 0.2 | 0.2 | — |
| Stabiliser Onepack 2 | [wt %] | — | — | 0.14 |
| Alpha-NA BNT | [wt %] | no | 2.0 | 2.0 |
| Temp. ranges of extruder zones | [° C.] | 140-300 | 140-300 | 150-280 |
| Specific Energy Input (SEI) | kWh/kg | 0.155 | 0.157 | 0.146 |
| Polymer melt temp. at melt pump | [° C.] | 244 | 242 | 231 |

The polypropylene compositions RE1 and RE2 show the properties as listed below in Table 3.

TABLE 3

| Properties of polypropylene compositions RE1 and RE2: | | | | |
|---|---|---|---|---|
| | | RE1 | RE2 | RE3 |
| alpha-NA | | no | BNT | BNT |
| MFR$_2$ | [g/10 min] | 1.2 | 1.3 | 3.9 |
| Flexural modulus | [MPa] | 335 | 370 | 378 |
| Charpy NIS (−20° C.) | [kJ/m$^2$] | 6.3 | 6.5 | 4.2 |
| Charpy NIS (23° C.) | [kJ/m$^2$] | 83.9 | 83.6 | 78.9 |
| Tm | [° C.] | 148.9 | 146.6 | 147.4 |
| Tc | [° C.] | 95.7 | 113.6 | 114.5 |
| Tm-Tc | [° C.] | 53.2 | 33.0 | 32.9 |
| C2 (total) | [wt %] | 12.4 | 12.4 | 11.3 |
| IV (total) | [cm$^3$/g] | 277 | 268 | 213 |
| XCS fraction | [wt %] | 35.6 | 34.7 | 35.6 |
| C2 (XCS) | [wt %] | 26.1 | 26.3 | 24.5 |
| V$_{int}$ (XCS) | [cm$^3$/g] | 251 | 243 | 189 |
| Mw (XCS) | [g/mol] | 294,500 | 285,000 | 215,000 |
| Mn (XCS) | [g/mol] | 45,650 | 45,400 | 48,900 |
| PDI (Mw/Mn) (XCS) | [—] | 6.4 | 6.3 | 4.4 |
| XCI fraction | [wt %] | 64.4 | 65.3 | 64.4 |

TABLE 3-continued

| Properties of polypropylene compositions RE1 and RE2: | | | | |
|---|---|---|---|---|
| | | RE1 | RE2 | RE3 |
| C2 (XCI) | [wt %] | 4.8 | 5.5 | 5.8 |
| IV (XCI) | [cm$^3$/g] | 286 | 275 | 216 |
| Mw (XCI) | [g/mol] | 384,500 | 372,500 | 271,000 |
| Mn (XCI) | [g/mol] | 69,500 | 68,100 | 62,000 |
| PDI (Mw/Mn) (XCI) | [—] | 5.5 | 5.5 | 4.4 |
| IV ratio (XCI/XCS) | [—] | 1.14 | 1.13 | 1.14 |
| Mw ratio (XCI/XCS) | [—] | 1.31 | 1.31 | 1.26 |

For the production of the polymer compositions of the inventive examples IE1, IE2, IE3 and IE4 and comparative example CE1 the compounded pellets of reference example RE1 was compounded in a second compounding step in a Buss 100 MDK L/D 11D co-kneader together with different additives.

For the production of the polymer compositions of the inventive examples IE5 and comparative example CE2 the compounded pellets of reference example RE2 was compounded in a second compounding step in a Buss 100 MDK L/D 1 ID co-kneader together with different additives.

An overview of the production of the polypropylene compositions CE1, IE1, IE2, IE3 and IE4 and CE2 and IE5 is shown in Table 4. The properties of CE1, IE1, IE2, CE2 and IE3 are shown in Table 5.

TABLE 4

| Compounding of IE1-IE5, CE1 and CE2 in a Buss 100 MDK L/D 11D co-kneader: | | | | | | | | |
|---|---|---|---|---|---|---|---|---|
| | | CE1 | IE1 | IE2 | IE3 | IE4 | CE2 | IE5 |
| Pellets | | RE1 | RE1 | RE1 | RE1 | RE1 | RE2 | RE2 |
| Versify 3300 | [wt %] | — | 10 | — | — | — | — | — |
| Versify 4200 | [wt %] | — | — | 10 | — | — | — | — |
| Vistamaxx 8800 | [wt %] | — | — | — | 10 | — | — | — |
| L-Modu S400 | [wt %] | — | — | — | — | 10 | — | — |
| Licocene PP 1302 | [wt %] | — | | | | | — | 10 |
| Mixer zones temperatures | [° C.] | | 125-213 | 120-207 | 113-193 | 121-195 | 132-210 | 103-194 |
| Mixer RPM | | | 148 | 156 | 150 | 148 | 150 | 150 |
| Specific Energy Input SEI | [kWh/kg] | | 0.29 | 0.25 | 0.22 | 0.24 | 0.29 | 0.21 |

Stabilizer Packages and Additives:

Stabiliser onepack 1 consists of 21.8 wt % Pentaerythrityl-tetrakis(3-(3',5'-di-tert. butyl-4-hydroxyphenyl)-propionate (CAS-No. 6683-19-8), 43.6 wt % Tris (2,4-di-t-butylphenyl) phosphite (CAS-No. 31570-04-4) and 34.6 wt % Calcium stearate (CAS-No. 1592-23-0), all commercially available from a variety of companies.

Stabiliser onepack 2 consists of 29 wt % Pentaerythrityl-tetrakis(3-(3',5'-di-tert. butyl-4-hydroxyphenyl)-propionate (CAS-No. 6683-19-8), 58 wt % Tris (2,4-di-t-butylphenyl) phosphite (CAS-No. 31570-04-4) and 13 wt % Magnesium Oxide (CAS-No. 1309-48-4), all commercially available from a variety of companies.

Alpha-nucleation via BNT was achieved by adding 2 wt % of a propylene homopolymer with an MFR$_2$ (230° C.) of 8.0 g/10 min and a melting temperature of 162° C., which is produced with a Ziegler-Natta type catalyst in the Borealis nucleation technology (BNT), comprising a polymeric $\alpha$-nucleating agent, and is distributed by Borealis AG (Austria).

Versify 3300 is a single-site catalysed poly(propylene-co-ethylene) elastomer having a melt flow rate $MFR_2$ of 8 g/10 min (ASTM D1238, 230° C., 2.16 kg), a density of 867 kg/m³ (ASTM D792), a crystallinity of 11% and a melting temperature of 62° C., commercially available from The Dow Chemical Company (data taken from technical data sheet).

Licocene PP 1302 is a single-site catalyzed poly(propylene-co-ethylene) wax having a melt viscosity at 170° C. of 150-250 mPas (DIN 53019), a density of 0.87 g/cm³ (ISO 1183), a drop point of 87-93° C. (ASTM D 3954), commercially available from Clariant (data taken from technical data sheet). Additionally GPC data has been measured as described above: Licocene PP 1302 has a crystallization temperature Tc of 42° C. (heat of crystallization He=27.0 J/g) and a melting temperature Tm of 81.° C. (heat of fusion Hf=25.3 J/g).

TABLE 5

| | | | | | | | | |
|---|---|---|---|---|---|---|---|---|
| Properties of the compounded compositions of CE1, IE1, IE2, IE3, IE4. CE2 and IE5 | | | | | | | | |
| | | CE1 | IE1 | IE2 | IE3 | IE4 | CE2 | IE5 |
| $MFR_2$ | [g/10 min] | 1.3 | 1.5 | 1.7 | 1.9 | 1.9 | 1.3 | 2.5 |
| Flex. modulus | [MPa] | 352 | 279 | 308 | 317 | 290 | 370 | 400 |
| Charpy NIS 23° C. | [kg/m³] | 75.9 | 77.6 | 77.2 | 72.1 | 80.2 | 83.6 | 76.4 |
| Charpy NIS −20° C. | [kg/m²] | 5.9 | 6.9 | 4.2 | 3.7 | 2.1 | 6.5 | 2.2 |
| Tm | [° C.] | 149.7 | 149.3 | 149.5 | 149.3 | 149.3 | 146.6 | 151.6 |
| Tc | [° C.] | 97.5 | 96.2 | 95.2 | 95.7 | 95.4 | 113.6 | 117.2 |
| Tm − Tc | [° C.] | 52.2 | 53.1 | 54.3 | 53.6 | 53.9 | 33.0 | 27.8 |
| Tg (EP) | [° C.] | −47.4 | −47.1 | −47.6 | −48.5 | −56.5 | −47.5 | −46.0 |
| Tg (Matrix) | [° C.] | −8.6 | −10.3 | −9.9 | −9.1 | −6.8 | −7.1 | −7.9 |
| C2 (total) | [wt %] | 12.4 | 12.4 | 11.8 | 11.6 | 11.5 | 12.4 | 11.0 |
| XCS fraction | [wt %] | 35.8 | 42.1 | 40.7 | 40.0 | 40.1 | 34.7 | 35.5 |
| C2 (XCS) | [wt %] | 25.6 | 22.7 | 22.0 | 22.1 | 21.0 | 26.3 | 23.0 |
| IV (XCS) | [cm³/g] | 247 | 235 | 228 | 218 | 205 | 243 | 204 |
| Mw (XCS) | [g/mol] | 260,500 | 244,000 | 232,500 | 225,000 | 219,000 | 285,000 | 221,500 |
| Mn (XCS) | [g/mol] | 40,750 | 46,900 | 43,600 | 36,000 | 37,750 | 45,400 | 50,300 |
| Mw/Mn (XCS) | [—] | 6.4 | 5.2 | 5.3 | 6.3 | 5.8 | 6.3 | 4.4 |
| XCI fraction | [wt %] | 64.2 | 57.9 | 59.3 | 60.0 | 59.9 | 65.3 | 64.5 |
| C2 (XCI) | [wt %] | 5.2 | 5.1 | 5.1 | 5.2 | 5.9 | 5.5 | 4.8 |
| IV (XCI) | [cm³/g] | 278 | 273 | 270 | 264 | 273 | 275 | 271 |
| Mw (XCI) | [g/mol] | 329,500 | 338,000 | 325,000 | 334,500 | 340,500 | 372,500 | 342,500 |
| Mn (XCI) | [g/mol] | 59,350 | 59,200 | 61,650 | 60,850 | 69,100 | 68,100 | 71,200 |
| Mw/Mn (XCI) | [—] | 5.6 | 5.7 | 5.3 | 5.5 | 4.9 | 5.5 | 4.8 |
| IV(XCI)/IV (XCS) | [—] | 1.13 | 1.16 | 1.18 | 1.21 | 1.33 | 1.13 | 1.33 |
| Mw(XCI)/Mw (XCS) | [—] | 1.26 | 1.39 | 1.40 | 1.49 | 1.55 | 1.31 | 1.55 |
| $\omega_{COP}$ | [1/s] | 14.0 | 15.8 | 16.4 | 14.8 | 15.0 | 14.4 | 16.04 |
| SHI 1/100 | [—] | 10.8 | 11.0 | 11.9 | 15.9 | 15.1 | 10.9 | 16.9 |
| PI | [1/s] | 2.7 | 2.8 | 2.8 | 3.4 | 3.3 | 2.7 | 3.5 |

Versify 4200 is a single-site catalysed poly(propylene-co-ethylene) elastomer having a melt flow rate $MFR_2$ of 25 g/10 min (ASTM D1238, 230° C., 2.16 kg), a density of 876 kg/m³ (ASTM D792), a crystallinity of 29% and a melting temperature of 84° C., commercially available from The Dow Chemical Company (data taken from technical data sheet).

Vistamaxx 8800 is a single-site catalysed poly(propylene-co-ethylene) elastomer having a melt flow rate $MFR_2$ of about 20000 g/10 min (estimated from the viscosity curve), a viscosity at 190° C. of 1200 mPas, a density of 879 kg/m³ and a melting temperature of 97° C., commercially available from ExxonMobil (data taken from technical data sheet).

L-Modo S400 is a single-site catalysed homopropylene elastomer having a melt flow rate $MFR_2$ of about 2600 g/10 min (ASTM D1238 230° C., 2.16 kg), molecular weight MW of 45000, a density of 870 kg/m³ (ISO1183), an isotactic pentad content [mmmm] of 30-60% and a melting temperature of 80° C., commercially available from Idemitsu Kosan Co., Ltd (data taken from technical data sheet).

It can be seen that the inventive compositions IE1 to IE4 show higher flexibility and better processability in form of a higher melt flow rate in addition to comparable crystallization and melting temperature and comparable impact properties (IE1 and IE2) compared to the comparative composition CE1.

It can further be seen that inventive composition IE5 shows better processability in form of a higher melt flow rate and higher crystallization and melting temperature at acceptable flexibility and impact properties compared to comparable composition CE2.

3. Production of 10 kV Cables 10 kV test cables were produced on a Maillefer pilot cable line of catenary continuous vulcanizing (CCV) type.

The conductors of the cable cores had a cross section being 50 mm² of stranded aluminium and had a cross section of 50 mm². For cables C1-C5 the inner semiconductive layer was produced from semiconductive composition SC2 as described below and had a thickness of 1.0 mm. For cables C6-C7 the inner semiconductive layer was produced from semiconductive composition SC3 as described below and had a thickness of 1.0 mm. The insulation layer was produced from the above described compositions CE1, CE2 and IE1 to IE5, and had a thickness of 3.4 mm. The outer semiconductive layer was produced from semiconductive compositions SC1 as described below and had a thickness of 1.0 mm.

The cables, i.e. cable cores, were produced by extrusion via a triple head. The insulation extruder had size 100 mm, the extruder for conductor screen (inner semiconductive layer) 45 mm, and the extruder for insulation screen (outer semiconductive layer) 60 mm. The line speed was 6.0 m/min.

The vulcanisation tube had a total length of 52.5 meter consisting of a curing section followed by a cooling section. The curing section was filled with $N_2$ at 10 bar but not heated. The 33-meter-long cooling section was filled with 20-25° C. water.

The pilot cables were then subjected to AC breakdown testing.

Semiconductive layer 1 (SC1) was prepared from ready-to-use semiconductive composition Borlink LE7710, which is a non-crosslinkable polyethylene based composition comprising carbon black, commercially available from Borealis AG.

Semiconductive layer 2 (SC2) was prepared from 66.5 wt % of the polypropylene based composition of RE3 with 33.0 wt % of carbon black Printex Alpha, commercially available from Orion Engineered Carbons GmbH, and 0.5 wt % maleic anhydride functionalized polypropylene Exxelor P01020, commercially available from Exxon Mobil.

Semiconductive layer 3 (SC3) was prepared from 66.5 wt % of the polypropylene based composition of RE1 with 33.0 wt % of carbon black Printex Alpha, commercially available from Orion Engineered Carbons GmbH, and 0.5 wt % maleic anhydride functionalized polypropylene Exxelor P01020, commercially available from Exxon Mobil.

Table 6 shows the electric properties of the 10 kV cables of examples C1-C5 in which the inventive insulation layers IE1-IE4 are compared to comparative insulation layer CE1.

Table 7 shows the electric properties of the 10 kV cables of examples C6-C7 in which the inventive insulation layer IE5 is compared to comparative insulation layer CE2.

TABLE 6

| Electric properties of 10 kV cables of C1-C5 | | | | | |
| --- | --- | --- | --- | --- | --- |
| | C1 | C2 | C3 | C4 | C5 |
| Insulation layer | CE1 | IE1 | IE2 | IE3 | IE4 |
| Inner semiconductive layer | SC2 | SC2 | SC2 | SC2 | SC2 |
| Outer semiconductive layer | SC1 | SC1 | SC1 | SC1 | SC1 |
| Weibull-alpha (scale) [kV/mm] | 42.3 | 49.0 | 49.8 | 45.4 | 46.9 |
| Weibull-beta (shape) | 14.3 | 12.9 | 18.0 | 37.8 | 10.9 |

It can be seen that the cables comprising the inventive insulation layers IE1, IE2, IE3 and IE4 all show an increased Weibull-alpha value compared to the cable comprising the accordant comparative insulation layer CE1. Cables C3 and C4 comprising the inventive insulation layers IE2 and IE3 even show an increased Weibull-beta value compared to the cable C1 comprising comparative insulation layer CE1.

TABLE 6

| Electric properties of 10 kV cables of C6-C7 | | |
| --- | --- | --- |
| | C6 | C7 |
| Insulation layer | CE2 | IE5 |
| Inner semiconductive layer | SC3 | SC3 |
| Outer semiconductive layer | SC1 | SC1 |

TABLE 6-continued

| Electric properties of 10 kV cables of C6-C7 | | |
| --- | --- | --- |
| | C6 | C7 |
| Weibull-alpha (scale) [kV/mm] | 48.7 | 52.4 |
| Weibull-beta (shape) | 11.0 | 18.7 |

It can be seen that the cable C7 comprising the inventive insulation layer IE5 shows an increased Weibull-alpha value and an increased Weibull-beta value compared to the cable C6 comprising the accordant comparative insulation layer CE2.

The invention claimed is:

1. A cable comprising at least one layer comprising a polypropylene composition comprising:
   (A) from 80.0 to 99.0 wt.-%, based on the total weight of the polypropylene composition, of a copolymer of propylene and comonomer units selected from ethylene and alpha-olefins having from 4 to 12 carbon atoms having
   a total amount of comonomer units of from 10.0 to 16.0 wt %, based on the total amount of monomer units of the copolymer of propylene (A), determined by quantitative $^{13}C\{^1H\}$ NMR measurement;
   a melt flow rate $MFR_2$ of from 0.5 to 2.5 g/10 min, determined according to ISO 1133 at 230° C. and 2.16 kg;
   a xylene cold soluble (XCS) fraction in a total amount of from 25.0 to 50.0 wt %, based on the total weight amount of the copolymer of propylene (A) and determined according to ISO16152; and
   (B) from 1.0 to 20.0 wt.-%, based on the total weight of the polypropylene composition, of a propylene polymer having
   a density of from 855 to 890 kg/m$^3$, determined according to ISO 1183 or ASTM D 792,
   wherein the polypropylene composition has an intrinsic viscosity of the xylene cold soluble (XCS) fraction of from 150 to 240 cm$^3$/g, measured in decalin, a glass temperature attributed to a matrix phase Tg (matrix) in the range of from −1.0 to −17.5° C. and a glass temperature attributed to an elastomeric phase Tg (EP) of from −40.0 to −55.0° C., both determined by dynamic mechanical analysis.

2. The cable according to claim 1, wherein the copolymer of propylene (A) is a heterophasic copolymer of propylene which comprises a matrix phase and an elastomeric phase dispersed in said matrix phase, which preferably comprises two glass transition temperatures attributed to the matrix phase and the elastomeric phase, wherein the glass transition temperature attributed to the matrix phase Tg (matrix) is in the range of from −1.0 to −15.0° C. and/or the glass transition temperature attributed to the elastomeric phase Tg (EP) is in the range of from −40.0 to −55.0° C., wherein Tg (matrix) and Tg (EP) are determined by dynamic mechanical analysis.

3. The cable according to claim 1, wherein xylene cold soluble (XCS) fraction of the copolymer of propylene (A) has an amount of comonomer units, preferably of ethylene, of from 23.0 to 35.0 wt %, based on the total amount of monomer units in the xylene cold soluble (XCS) fraction and determined by quantitative $^{13}C\{^1H\}$ NMR measurement and/or an intrinsic viscosity of from 150 to 350 cm$^3$/g, measured in decalin according to ISO 1628-3; and/or the copolymer of propylene (A) has a fraction insoluble in cold xylene (XCI) in a total amount of from 50.0 to 75.0 wt %, based on the total weight amount of the copolymer of propylene (A) and determined according to ISO16152, and wherein the fraction insoluble in cold xylene (XCI) preferably has an amount of comonomer units, preferably of ethylene, of from 3.0 to 9.0 wt %, based on the total amount of monomer units in the fraction insoluble in cold xylene (XCI) and determined by quantitative $^{13}C\{^1H\}$ NMR measurement and/or an intrinsic viscosity of preferably from 185 to 350 cm$^3$/g, measured in decalin according to ISO 1628-3.

4. The cable according to claim 1, wherein the copolymer of propylene (A) has one or more or all of the following properties:
   a flexural modulus of from 130 MPa to 400 MPa, determined according to ISO 178 method A; and/or
   a Charpy notched impact strength at 23° C. of from 50 to 110 kJ/m$^2$, determined according to ISO 179-1/1 eA; and/or
   a Charpy notched impact strength at –20° C. of from 5.0 to 10.0 kJ/m$^2$, determined according to ISO 179-1/1 eA.

5. The cable according to claim 1, wherein the propylene polymer (B) is a propylene homopolymer, an elastomeric copolymer of propylene and ethylene or a wax of copolymer of propylene and ethylene.

6. The cable according to claim 1, wherein the propylene polymer (B) is a propylene homopolymer having one or more or all of the following properties:
   a melt flow rate MFR$_2$ of from 500 to 5000 g/10 min, determined according to ISO 1133 at 230° C. and 2.16 kg; and/or
   a melting temperature Tm of from 65 to 95° C., determined by differential scanning calorimetry; and/or
   a weight average molecular weight Mw of from 20 to 100 kg/mol, measurable by GPC; and/or
   a viscosity at 190° C. of from 1000 to 50000 mPas; and/or
   a tensile modulus of from 25 to 150 MPa, measurable by ISO 527-1.

7. The cable according to claim 1, wherein the propylene polymer (B) is an elastomeric copolymer of propylene and ethylene having one or more or all of the following properties:
   a melt flow rate MFR$_2$ of from 5000 to 50000 g/10 min, determined according to ISO 1133 at 230° C. and 2.16 kg; and/or
   a melting temperature Tm of from 80 to 110° C., determined by differential scanning calorimetry; and/or
   a glass transition temperature Tg of from –40 to –10° C., determined by dynamic mechanical analysis; and/or
   a viscosity at 190° C. of from 500 to 10000 mPas; and/or
   an ethylene content of from 2.5 to 10.0 wt.-%, measurable using quantitative nuclear-magnetic resonance (NMR) spectroscopy.

8. The cable according to claim 1, wherein the propylene polymer (B) is an elastomeric copolymer propylene and ethylene having one or more or all of the following properties:

a melt flow rate MFR$_2$ of from 5.0 to 100 g/10 min, determined according to ISO 1133 at 230° C. and 2.16 kg; and/or
   a melting temperature Tm of from 50 to 95° C., determined by differential scanning calorimetry; and/or
   a glass transition temperature Tg of from –40 to –10° C., determined by dynamic mechanical analysis; and/or
   a crystallinity of from 5 to 50%; and/or
   a flexural modulus of from 15 to 200 MPa, determined according to ISO 178 method A.

9. The cable according to claim 1, wherein the propylene polymer (B) is wax of copolymer propylene and ethylene having one or more or all of the following properties:
   a melt viscosity at 170° C. of from 50 to 500 mPas; and/or
   a melting temperature Tm of from 65 to 95° C., determined by differential scanning calorimetry; and/or
   a crystallization temperature Tc of from 25 to 55° C., determined by differential scanning calorimetry; and/or
   a drop point of from 75 to 105° C., measurable according to ASTM D 3954.

10. The cable according to claim 1, wherein the polypropylene composition has one or more or all of the following properties:
   a melt flow rate MFR$_2$ of 0.5 to 3.5 g/10 min, determined according to ISO 1133 at 230° C. and 2.16 kg; and/or
   a melting temperature Tm of from 140 to 159° C., determined by differential scanning calorimetry; and/or
   a crystallization temperature Tc of from 85 to 130° C., determined by differential scanning calorimetry; and/or
   a difference of the melting temperature to the crystallization temperature Tm-Tc is in the range of from 20 to 65° C.; and/or
   shear thinning index SHI$_{1/100}$ of from 2.5 to 22.5, determined by dynamic shear measurements; and/or
   a polydispersity index PI of from 1.0 to 4.5 s$^{-1}$, determined by dynamic shear measurements.

11. The cable according to claim 1, wherein the polypropylene composition has one or more or all of the following properties:
   a flexural modulus of from 150 MPa to 450 Mpa, determined according to ISO 178 method A; and/or
   a Charpy notched impact strength at 23° C. of from 50 to 110 KJ/m$^2$, determined according to ISO 179-1/1 eA; and/or
   a Charpy notched impact strength at –20° C. of from 1.5 to 25.0 kJ/m$^2$, determined according to ISO 179-1/1 eA.

12. The cable according to claim 1, wherein the polypropylene composition is free of a dielectric fluid.

13. The cable according to claim 1, wherein the at least one layer is an insulation layer.

14. The cable according to claim 1 being a medium voltage cable or high voltage cable, comprising an insulation layer comprising the polypropylene composition.

15. The cable according to claim 1 having a Weibull alpha-value of from 35.0 to 65.0 kV/mm and/or a Weibull beta-value of from 5.0 to 250.0, measured on a 10 kV cable in agreement with CENELEC HD 605 5.4.15.3.4 for 6/10 kV cables.

* * * * *